(12) United States Patent
Ikemoto et al.

(10) Patent No.: US 7,347,475 B2
(45) Date of Patent: Mar. 25, 2008

(54) AUTOMOBILE REAR BODY STRUCTURE

(75) Inventors: Nobuyuki Ikemoto, Fuchu-cho (JP); Yasuhiro Kohara, Fuchu-cho (JP); Shirou Nakatani, Fuchu-cho (JP); Kazue Sumida, Fuchu-cho (JP); Takao Maruko, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 162 days.

(21) Appl. No.: 11/270,614

(22) Filed: Nov. 10, 2005

(65) Prior Publication Data

US 2006/0103170 A1 May 18, 2006

(30) Foreign Application Priority Data

Nov. 12, 2004 (JP) ............................. 2004-329836
Nov. 12, 2004 (JP) ............................. 2004-329837
Mar. 29, 2005 (JP) ............................. 2005-095566

(51) Int. Cl.
*B60R 11/06* (2006.01)

(52) U.S. Cl. ............................. 296/37.16; 296/193.08; 296/203.04

(58) Field of Classification Search ........... 296/193.08, 296/203.04, 204, 37.16, 37.14
See application file for complete search history.

(56) References Cited

U.S. PATENT DOCUMENTS 4,968,087 A * 11/1990 Goria .................... 296/193.04

6,053,566 A    4/2000  Aghssa et al.
2004/0066061 A1  4/2004  Engels et al.

FOREIGN PATENT DOCUMENTS

DE  10110163    9/2002
JP  2002-029457  1/2002
JP  2003/225575  8/2003

OTHER PUBLICATIONS

European Search Report, EP 05024451, dated Apr. 11, 2007.

* cited by examiner

*Primary Examiner*—Lori L. Lyjak
(74) *Attorney, Agent, or Firm*—Nixon Peabody LLP; Donald R. Studebaker

(57) ABSTRACT

An automobile rear body structure capable of allowing a space created between a rear bumper reinforcing member and a line connecting respective rear ends of a pair of rear side frames to be effectively utilized. In this automobile rear body structure, a rear end cross member (30) has an expanded portion (31*a*) formed to expand rearward relative to respective rear ends (10*a*) of a pairs of rear side frames (10), and a rear floor pan (20) has a rear edge including a protruded portion (21). The protruded portion (21) is formed to protrude relative to the rear ends (10*a*) of the pairs of rear side frames (10) toward the expanded portion of the rear end cross member (30) and connected to the rear end cross member (30), so as to allow a luggage compartment space to be enlarged rearward relative to the rear ends (10*a*) of the pairs of rear side frames (10).

12 Claims, 5 Drawing Sheets

AUTOMOBILE REAR BODY STRUCTURE

BACKGROUND OF THE INVENTION

1. Field of the Invention

The present invention relates to an automobile rear body structure.

2. Description of the Background Art

Generally, an automobile is designed to have a luggage compartment space defined in a rear body thereof. In automobile design techniques, it is one of critical factors to ensure a wide luggage compartment space in view of providing enhanced utility. In a design process for increasing a luggage compartment space, it is required to give further consideration to ensuring adequate body rigidity. That is, an automobile rear body structure has to be designed to satisfy the need for increasing a luggage compartment space while ensuring adequate body rigidity. As typical automobile rear body structures, there has been known one type as disclosed, for example, in Japanese Patent Laid-Open Publication No. 2002-29457.

In the automobile rear body structure disclosed in the Japanese Patent Laid-Open Publication No. 2002-29457, a pair of rear side members as one skeletal frame constituting an automobile body are disposed to extend a frontward/rearward or longitudinal direction of the automobile body, and a rear floor panel is joined along respective top edges of the rear side members. An underfloor box for use as a spare tire storage or a sub-trunk is formed in a space above the rear floor panel. Further, a cross member as another skeletal frame constituting an automobile body is joined to respective rear ends of the rear side members in a front lower end region thereof in such a manner as to be located in a rearward and upward position relative to the rear side members in its entirety. This cross member is disposed to extend in a width or lateral direction of the automobile body so as to define a rear end of the underfloor box. The cross member consists of a rear end cross panel and a rear panel each extending in the lateral direction. The rear end cross panel and the rear panel are joined together at their front lower ends and at their rear upper ends, so that the cross member has a closed section defined therebetween. A shock absorbing member is attached to each of the rear ends of the rear side members. The shock absorbing member is designed to absorb an impact force acting thereon through a bumper disposed at a rearward position relative to the shock absorbing member, during a rear-impact vehicle collision.

Figure 5:
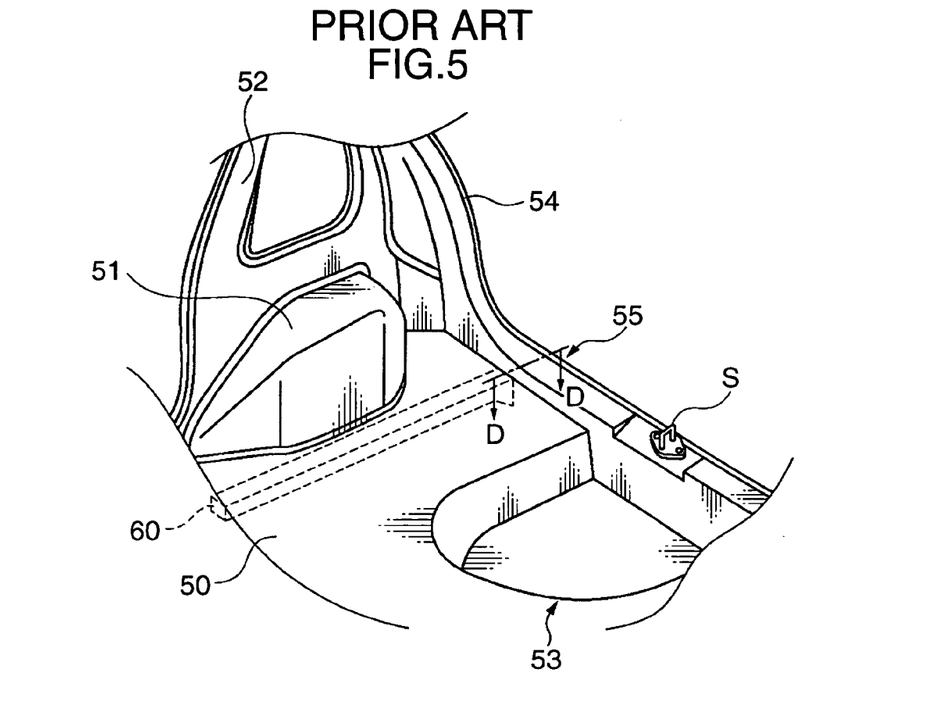
FIG. 5 a fragmentary perspective view showing a luggage compartment space in a rear body of a conventional automobile.
Figure 6:
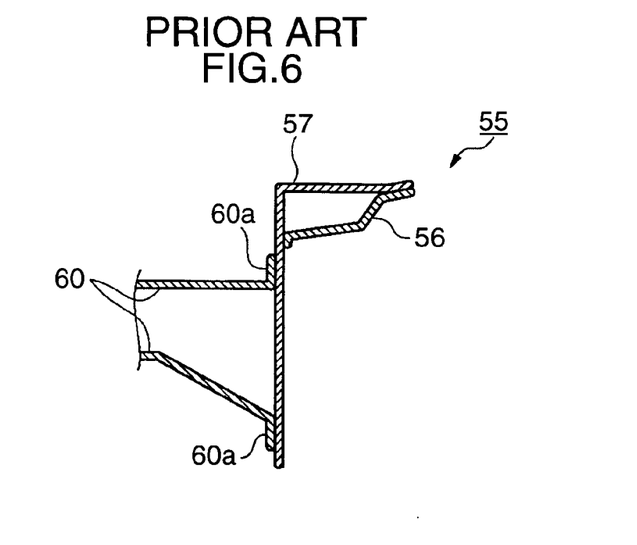
FIG. 6 is a sectional view of a rear end cross member, taken along the line D-D in FIG. 5.

FIG. 5 is a fragmentary perspective view shows a luggage compartment space in a rear body of a conventional automobile (hatchback type). FIG. 6 is a sectional view of a rear end cross member 55, taken along the line D-D in FIG. 5. The conventional rear body structure will be described below with reference to FIGS. 5 and 6. A rear floor pan 50 is disposed in the luggage compartment space to define a bottom thereof. This rear floor pan 50 is supported by a pair of rear side frames 60 each of which is a frame member extending in a frontward/rearward or longitudinal direction of the automobile body. The rear floor pan 50 has opposite lateral edges each cut off in conformity to a shape of a corresponding one of a pair of laterally opposed wheelhouse inner panels 51 and joined to the corresponding wheelhouse inner panel 51. The rear floor pan 50 is formed with a concave portion 53 serving as a spare tire storage for storing a spare tire therein.

The rear end cross member 55 is disposed to extend along a width or lateral direction of the automobile body. This rear end cross member 55 is joined to respective rear ends of the rear side frames 60 and along a rear edge of the rear floor pan 50. The rear end cross member 55 has opposite lateral ends each connected to a corresponding one of a pair of rear pillars 54. A striker S engageable with a latch (not shown) of a rear gate (not shown) is attached on a laterally central region of a top surface of the rear end cross member 55.

As shown in FIG. 6, the rear end cross member 55 consists of a rear panel 56 and a front panel 57 which define a closed section therebetween. The front panel 57 extends downward from its closed-section-defining portion to form a flange. Each of the rear ends 60*a* of the rear side frame 60 is joined to the flange. Further, a rear bumper reinforcing member and a rear bumper are attached to the flange from the rear side thereof.

In some types of automobiles, such as hatchback type, it is proposed to design a rear end of an automobile body to protrude rearward in a substantially circular arc shape in top plan view, like the tail of an insect (hereinafter referred to as "rear protrusion type"). This sort of design is getting attention as one technique for improving the aesthetic quality in external appearance of an automobile.

However, the conventional rear protrusion type automobile body structure has a problem that, while a certain space is created between a line connecting respective rear ends of a pair of rear side frames, and a rear bumper reinforcing member attached at a rearward position relative to the rear side frames, the created space is left as a dead space or is not effectively utilized.

SUMMARY OF THE INVENTION

In view of the above problems, it is one object of the present invention to provide a rear body structure for an automobile, such as a rear protrusion type automobile, capable of allowing a space created between a rear bumper reinforcing member and a line connecting respective rear ends of a pair of rear side frames to be effectively utilized.

In order to achieve the above object, an automobile rear body structure of the present invention comprises an opening formed in a rear end of an automobile rear body and adapted to be selectively opened and closed by a lid, a rear floor pan supported by a pair of laterally-spaced rear side frames to define a bottom of a luggage compartment space of the automobile rear body, and a rear end cross member fixed to respective rear ends of the pair of rear side frames. The rear end cross member has an expanded portion formed to expand rearward relative to the rear ends of the pairs of rear side frames, and the rear floor pan has a rear edge including a protruded portion which is formed to protrude relative to the rear ends of the pairs of rear side frames toward the expanded portion of the rear end cross member and connected to the rear end cross member, so as to allow the luggage compartment space to be enlarged rearward relative to the rear ends of the pairs of rear side frames.

In this automobile rear body structure, a longitudinal length of the luggage compartment space is increased based on the expanded portion and the protruded portion formed in the above manner. Thus, according to the present invention, the additional luggage compartment space defined by the expanded portion and the protruded portion can be positioned in a space created between a line connecting the rear ends of the pair of rear side frames and a rear bumper reinforcing member attached at a rearward position relative to the rear side frames, so as to allow the space between the rear side frames and the rear bumper reinforcing member to be effectively utilized as a luggage compartment space. In addition, the luggage compartment space can be enlarged based on the expanded portion and the protruded portion formed, respectively, to expand and protrude relative to the rear ends of the rear side frames, as described above. Thus, there is no need for elongating the rear side frames. Further, the expanded portion can be formed in conformity to a shape of a rear end, for example, of a rear protrusion type automobile. This fits a design requirement of the rear protrusion type automobile. While the present invention is suitable, particularly, for the rear protrusion type automobile, it may be any other type of automobile having a space created between a rear bumper reinforcing member and a line connecting respective rear ends of a pair of rear side frames.

DESCRIPTION OF THE PREFERRED EMBODIMENTS

Figure 1A:
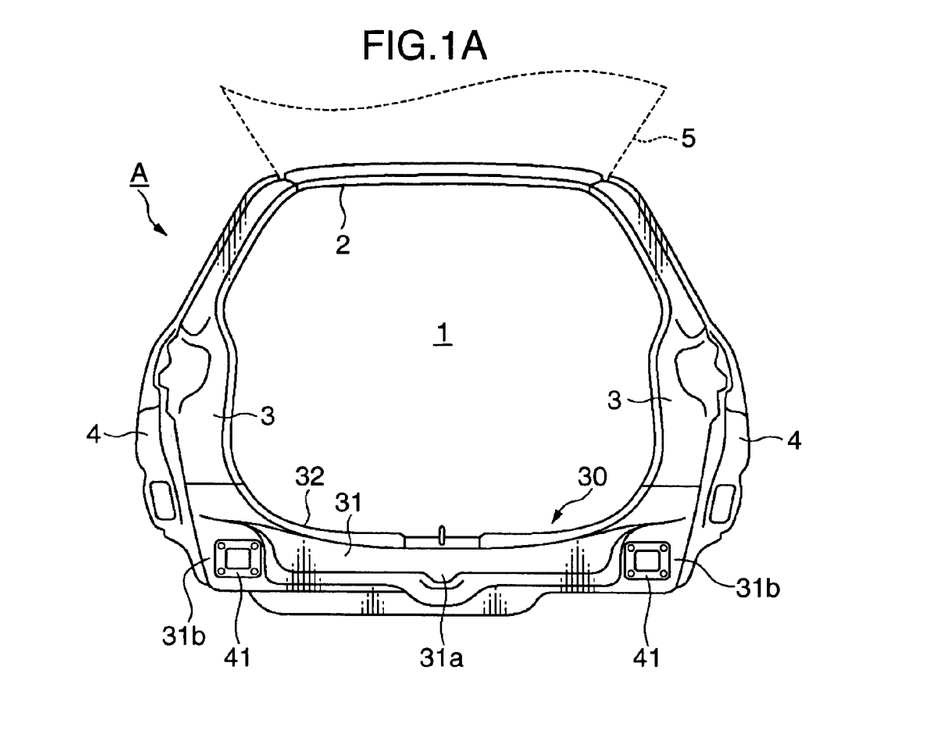
FIG. 1A is a rear view of a body of an automobile A employing an automobile rear body structure according to one embodiment of the present invention.

An embodiment of the present invention will now be described by taking a rear protrusion type hatchback as an example of an automobile A. As shown in FIG. 1A, an opening 1 adapted to be selectively opened and closed by a lid (rear hatch door) 5 is formed in a rear end of a rear body of the automobile A. A luggage compartment space of the rear body is defined inside the opening 1. Thus, a user can open the lid 5 to access the luggage compartment space from the outside through the opening 1. The opening 1 is defined by a roof panel 2, a pair of laterally-spaced right and left rear pillars 3 supporting the roof panel 2, and a rear end cross member 30 having opposite lateral ends each connected to a corresponding one of lower ends of the pair of right and left rear pillars 3. The opening 1 is formed to have a substantially rectangular shape. Each of the rear pillars 3 has an outer edge fixed to an outer side panel 4.

The rear end cross member 30 comprises a rear end panel 31, and a reinforcement panel 32 attached to the rear end panel 31 at a frontward position relative to the rear end panel 31. The rear end panel 31 forms a rear surface of the rear end cross member 30, and the reinforcement panel forms a front surface and a top surface of the rear end cross member 30. The rear end panel 31 has opposite lateral end regions each formed as a fixing portion onto which a corresponding one of a pair of crushable tubes 41 is attached. The crushable tubes 41 serve as a mounting member for an after-mentioned rear bumper reinforcing member 40 (not shown in FIG. 1A). The rear bumper reinforcing member 40 serves as a reinforcing member for an after-mentioned rear bumper (bumper facia) 50 (not shown in FIG. 1A).

Figure 1B:
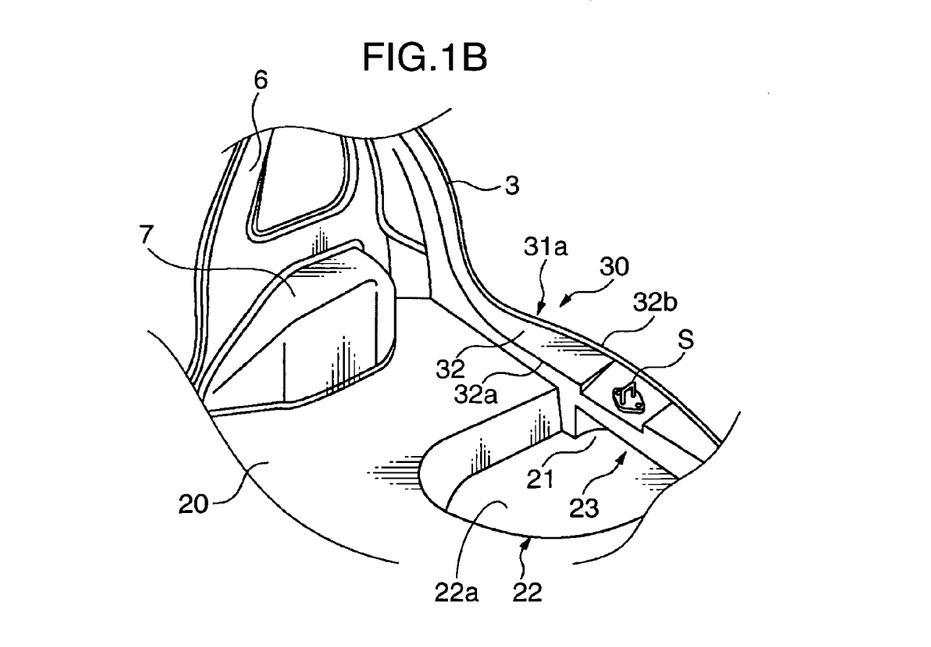
FIG. 1B is a fragmentary perspective view showing a luggage compartment space in a rear body of the automobile A.

Referring to FIG. 1B, a rear floor pan 20 is installed in the luggage compartment space to define a bottom of the luggage compartment space. The rear floor pan 20 has opposite lateral edges each cut off in conformity to a shape of a corresponding one of a pair of laterally opposed wheelhouse inner panels 7 and joined to the corresponding wheelhouse inner panel 7. Each of the wheelhouse inner panels 7 is joined to a corresponding one of a pair of laterally opposed rear side panels 6. The rear floor pan 20 is formed with a concave portion 22 serving as a spare tire storage for storing a spare tier. A bottom 22a of the concave portion 22 has a rear edge region formed as a protruded portion protruding to get into an installation zone of the rear end cross member 30. In this embodiment, an additional luggage compartment space 23 allowing the original luggage compartment space to be enlarged is defined by above the protruded portion.

With reference to FIG. 1B, the outline of the automobile rear body structure according to this embodiment will be described below. As mentioned above, this embodiment is described on the assumption that the automobile A is a rear protrusion type. In the rear protrusion type automobile, due to the protrusion of a rear end thereof, a void space is created between a rear bumper reinforcing member and a line connecting respective rear ends of a pair of rear side frames. In other words, a void space is created at a rearward position relative to a rear end panel (31). With this in mind, in this embodiment, the expanded portion 31a is formed in the rear end panel 31 in proportion to the protrusion of the rear end of the automobile rear body to define the additional luggage compartment space 23 so as to allow the original luggage compartment space to be enlarged rearward. In addition, the rear end cross member 30 allows the body structure around the opening 1 to have enhanced rigidity against deformation.

Figure 2:
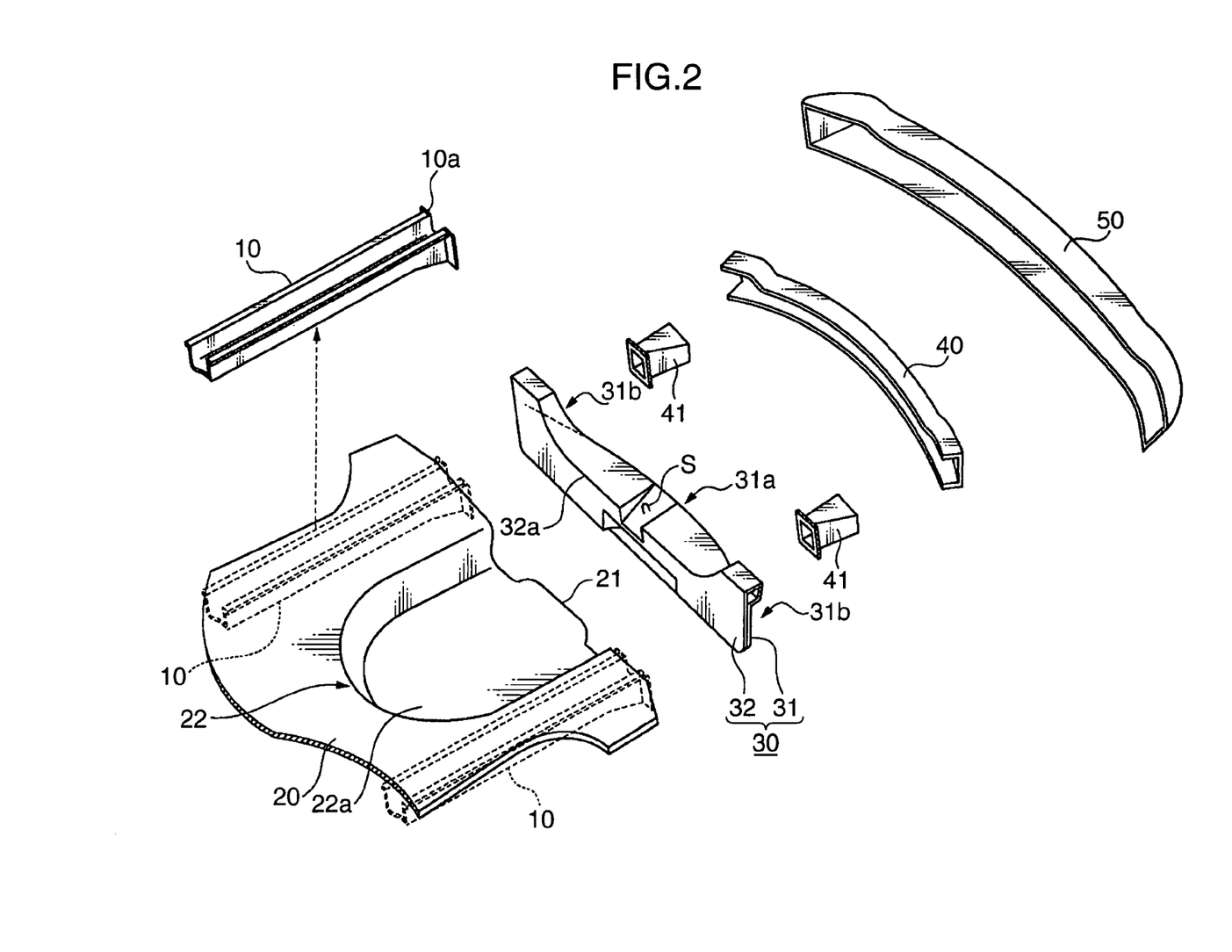
FIG. 2 is a fragmentary exploded perspective view of the automobile rear body structure according to the embodiment of the present invention.
Figure 3A:
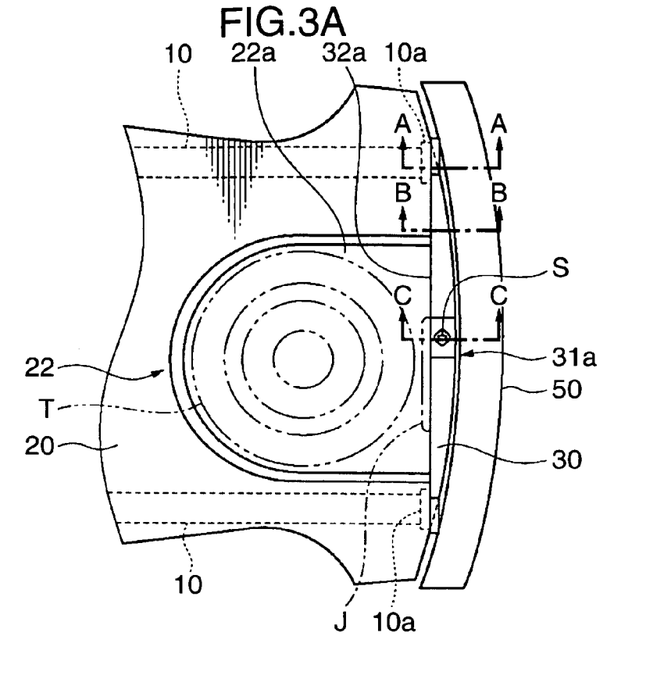
FIGS. 3A and 3B are fragmentary top plan views of the automobile rear body structure according to the embodiment of the present invention.
Figure 3B:
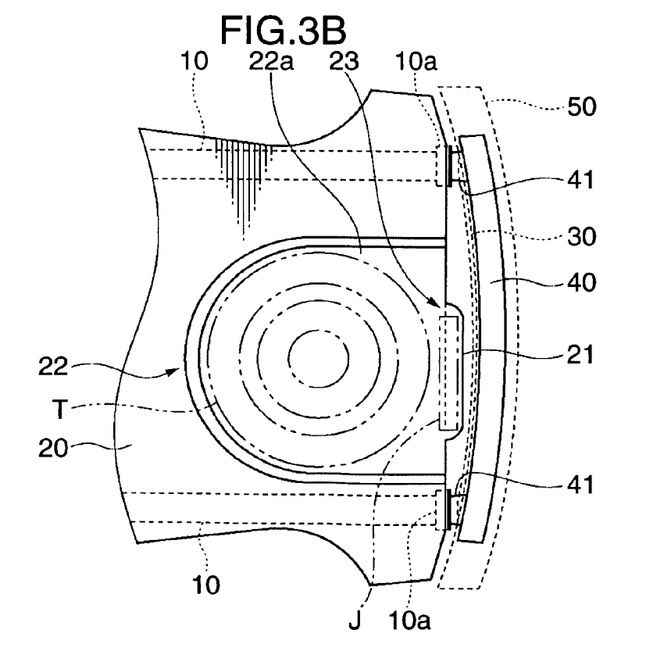

Further, as shown in FIGS. 3A and 3B, in the automobile rear body structure according to this embodiment, the rear bumper 50 is curved rearward in a substantially circular arc shape in top plan view. This shape of the rear bumper 50 provides a protruded shape in the rear end of the automobile rear body structure. As shown in FIG. 2, the rear floor pan 20 is joined along respective top edges of the pair of right and left rear side frames 10. That is, the rear floor pan 20 is supported by and mounted on the pair of right and left rear side flames 10. The aforementioned concave portion 22 serving as a spare tier storage is formed in the rear floor pan 20 at a position located between the pair of rear side frames 10.

In this embodiment, the concave portion 22 is formed to have a longitudinal center line deviating leftward (in FIG. 1A) from a longitudinal center line of the rear floor pan 20. The concave portion 22 is formed to expand downward so as to have a substantially inverted hat-shaped section in its front region and a substantially rectangular cup-shaped section in its rear region continuously extending rearward from the front region. As shown in FIG. 2, the rear edge of the rear floor pan 20 includes the protruded portion 21 formed to protrude rearward. This protruded portion 21 is connected to the rear end cross member 30. As described with reference to FIG. 1B, the protruded portion 21 defines the additional luggage compartment space 23 allowing the original luggage compartment space above the rear floor to be enlarged rearward relative to the rear ends 10a of the rear side frames 10. In this embodiment, the protruded portion 21 is formed to elongate the bottom of the concave portion 22.

Figure 4A:
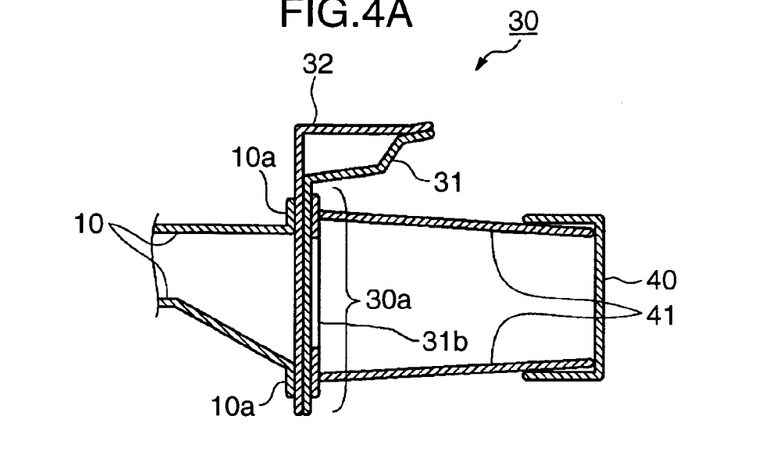
FIG. 4A is a sectional view of a rear end cross member, taken along the line A-A in FIG. 3A.
Figure 4B:
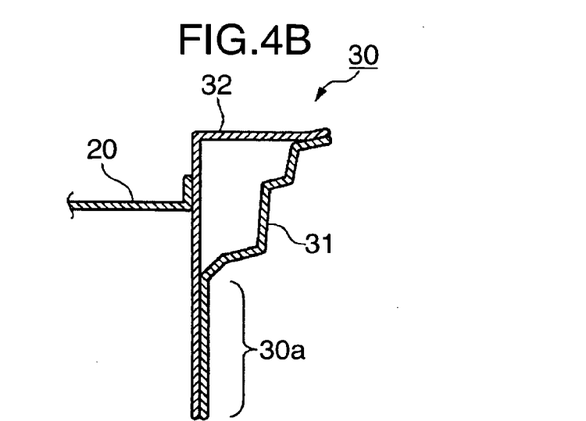
FIG. 4B is a sectional view of the rear end cross member, taken along the line B-B in FIG. 3A.
Figure 4C:
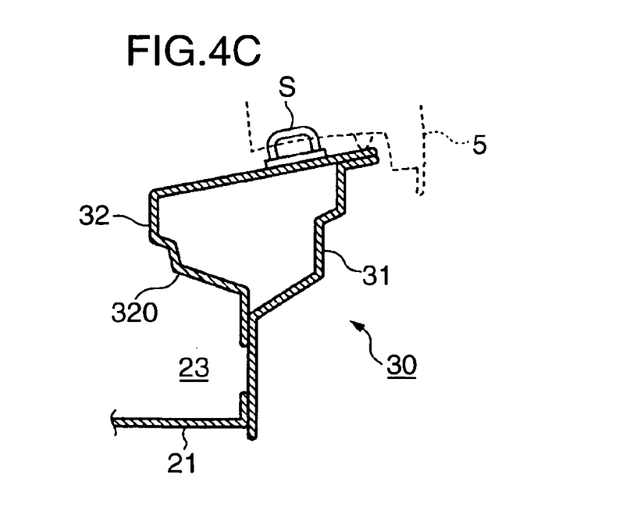
FIG. 4C is a sectional view of the rear end cross member, taken along the line C-C in FIG. 3A.

As mentioned above, the rear end cross member 30 comprises the rear end panel 31 and the reinforcement panel 32, and a closed section is defined therebetween as shown in FIGS. 4A to 4C. The reinforcement panel 32 forms the top surface of the rear end cross member 30, and has opposite lateral ends joined, respectively, to the rear pillars 3, as described with reference to FIG. 1A.

As shown in FIGS. 3A, 3B and 4C, the rear end cross member 30 is joined to and fixed to the respective rear ends 10a of the pair of rear side frames 10. The rear end cross member 30 has the expanded portion 31a formed to expand rearward relative to the rear ends 10a of the pair of rear side frames 10. This expanded portion 31a is formed in the rear end panel 32. Specifically, the expanded portion 31a is formed in conformity to a shape of the rear bumper 50 in top plan view to expand rearward in a substantially circular arc shape in top plan view.

The reinforcement panel 32 has a rear edge 32b serving as a rear edge of the rear end cross member 30. In conformity to a shape of the expanded portion 31a, the rear edge 32b is formed to have a substantially circular arc shape and project rearward relative to the rear ends 10a of the pair of rear side frames 10, except for opposite lateral end region thereof. The reinforcement panel 32 also has a front edge 32a serving as a front edge of the rear end cross member 30. The front edge 32a is formed to laterally extend substantially linearly to connect between the respective rear ends 10a of the pair of rear side frames 10. That is, the rear end cross member 30 is generally formed to have a rear edge projecting in a substantially circular arc shape, and a front edge extending substantially linearly to connect between the rear ends 10a of the pair of rear side frames 10 at the shortest distance. Thus, as seen in FIGS. 4A to 4C, a sectional area of the closed section in the rear end cross member 30 formed to have the substantially linear-shaped front edge and the substantially circular arc-shaped projecting rear edge is maximized in a laterally central region of the rear end cross member 30, and gradually reduced toward the lateral edges thereof. As shown in FIGS. 1B, 2, 3A and 4A, a striker S is attached onto the laterally central region of the rear end cross member 30 (specifically the reinforcement member 32). The striker S is adapted to engage a lower portion of the lid 5 when the lid 5 is operated to close the opening 1.

As shown in FIG. 4A, the rear end cross member 30 in this embodiment has a superimposed panel portion 30a formed by superimposing respective lower regions of the rear end panel 31 and the reinforcement panel 32 on one another. The rear end cross member 30 is joined to the rear ends 10a of the rear side frames 10 using this superimposed panel portion 30a. This makes it possible to increase rigidity in the joined region so as to provide enhanced body rigidity.

In view of enhancement in bending rigidity of the rear end cross member 30 and in body rigidity, it is desirable to form the superimposed panel portion 30a not only in the joined region between the rear end cross member 30 and the rear ends 10a of the pair of rear side frames 10 but also over a wide range of the lateral region of the rear end cross member 30. From this reason, in the rear end cross member 30 in this embodiment, the superimposed panel portion 30a is also formed at a position indicated by the line B-B in FIG. 3. This makes it possible to further increase the bending rigidity of the rear end cross member 30. In addition, for example, the rear side frames 10 joined to the superimposed panel portion 30a having significantly increased rigidity obtained by two superimposed members can have a sufficiently suppressed displacement relative to the rear end cross member 30 to achieve adequately enhanced rigidity in the rear body.

On the other hand, the formation of such a superimposed panel portion is likely to cause increase in body weight. However, the superimposed panel portion 30a in this embodiment is formed in lateral positions on both sides of the concave portion 22 serving as a spare tire storage except for a lateral position corresponding to the concave portion 22. More specifically, as shown in FIG. 4C, the rear end cross member 30 does not have the superimposed panel portion 30a as shown in FIGS. 4A and 4B, in the lateral position thereof corresponding to the concave portion 22. That is, in the lateral position of the rear end cross member 30 corresponding to the concave portion 22, only either one of the rear end panel 31 and the reinforcement panel 32 (only the rear end panel 31 in this embodiment) is joined to the protruded portion 21 of the rear floor pan 20. This structure makes it possible to facilitate reduction in body weight while maintaining an adequate joining strength between the rear end cross member 30 and the rear side frames 10.

As shown in FIG. 4A, a pair of crushable tubes 41 are attached, respectively, to the rear ends 10a of the pair of rear side frames 10 through the rear end cross member 30. As shown in FIG. 1A, the rear end panel 31 has a pair of fixing portions 31b each having a corresponding one of the pair of crushable tubes 41 fixed thereto. For example, each of the crushable tubes 41 is fastened using a bolt (not shown) or the like fixed to the corresponding fixing portion 31b. In this embodiment, the expanded portion 31a is formed between the pair of fixing portions. The crushable tubes 41 will be crushed during an automobile collision to serve as a means to minimize damages of the body.

The rear bumper reinforcing member 40 is formed to have a substantially circular arc shape in top plan view in conformity to the shape of the rear bumper 50 in top plan view and the shape of the rear edge of the rear end cross member 30 in top plan view. The rear bumper reinforcing member 40 is disposed between the rear end cross member 30 and the rear bumper 50. The rear bumper reinforcing member 40 is connected to the respective rear ends 10a of the pair of rear side frames 10 through the rear end cross member 30 and the crushable tubes 41.

According to the above structure, a lattice-shaped frame in top plan view is formed in the rear body by the rear end cross member 30, the rear bumper reinforcing member 40 and the crushable tubes 41. Thus, the rear ends 10a of the pair of rear side frames 10 are connected to one another by not only the rear end cross member 30 but also the rear bumper reinforcing member 40, so that displacements between these members can be restricted. This makes it possible to further increase the body rigidity. Further, this structure has an advantage of being able to strengthen each attached end of the crushable tubes 41 so as to facilitate exerting an initial shock-absorbing function of the crushable tubes 41.

The additional luggage compartment space 23 will be described in more detail below. The protruded portion 21 of the rear floor pan 20 protrudes relative to the rear ends 10a of the pair of rear side frames 10 toward the expanded portion 31a. That is, the protruded portion 21 of the rear floor pan 20 protrudes rearward in the region of the rear end cross member 30 formed with the expanded portion 31a. As shown in FIG. 4C, the protruded portion 21 of the rear floor pan 20 is connected or joined to the rear end panel 31 (a lower region of the rear end panel 31 formed with the expanded portion 31a). The front edge 32a of the reinforcement panel 32 is generally located at a frontward position relative to the rear end panel 31. Further, in a region of the rear end cross member 30 located above the protruded portion 21, a lower edge of the reinforcement panel 32 is joined to the rear end panel 32 at a position above the protruded portion 21, and a portion of the reinforcement panel 32 located at a position corresponding to an upper portion of the rear end panel 31 is formed to extend frontward relative to the rear end panel 31 so as to overhang above the protruded portion 21. This overhanging portion 320 formed in the reinforcement panel 32 defines a space thereunder. The resulting defined space is the additional luggage compartment space 23 surrounded by the protruded portion 21, the reinforcement panel 32 and the rear end panel 31. As shown in FIGS. 3A and 3B, the concave portion 22 of the rear floor pan 20 can be used for storing a spare tire T or the like, and the additional luggage compartment space 23 can be used, for example, for storing a jack J or the like, as best shown in FIG. 3B.

In the above embodiment, the expanded portion 31a and the protruded portion 21 are provided to define the additional luggage compartment space 23 so as to increase the longitudinal length of the luggage compartment space above the rear floor pan 20. This allows the luggage compartment space to be enlarged rearward. In addition, even if the luggage compartment space is enlarged based on the expanded portion 31a and the protruded portion 21, the expanded portion 31a and the protruded portion 21 will be formed, respectively, to expand and protrude relative to the rear ends 10a of the rear side frames 10. Thus, there is no need for elongating the rear side frames 10. Further, the expanded portion 31a can be formed in conformity to a shape of a rear end of a rear protrusion type automobile or the shape of the rear bumper 50. This fits a design requirement of the rear protrusion type automobile. That is, in the rear protrusion type automobile, not only aesthetic design quality but also functionality, particularly enlargement of a luggage compartment space, can be improved. Furthermore, the rear edge (32b) of the rear end cross member 30 is formed in conformity to the shape of the rear bumper 50 in top plan view, so that the lid 5 can be formed in conformity to the shape of the rear bumper 50.

In conventional rear protrusion type automobiles, a rear end panel is designed to have a substantially linear shape in its entirety. Thus, a void space is inevitably created between the rear end panel and a rear bumper. In contrast, the automobile rear body structure according to above embodiment is designed to form the expanded portion 31a in the rear end panel 31 so as to reduce a void space between the rear end panel 31 and the rear bumper 50 (rear bumper reinforcing member 40) and effectively utilize the space as the additional luggage compartment space 23.

In the above embodiment, the rear end cross member 30 is connected to the rear pillars 3, so that the body structure around the opening 1 can have enhanced rigidity against deformation. In particular, differently from the rear end (32b) of the rear end cross member 30 formed with the expanded portion 31a, the front edge (32a) of the rear end cross member 30 is formed to extend substantially linearly to connect between the rear ends 10a of the pair of rear side frames 10. Thus, the bending rigidity of the rear end cross member 30 can be increased. Comparing with the case where the rear end cross member 30 has a front edge formed to project rearward in a substantially circular arc shape in the same manner as that in the rear edge, the rear end cross member 30 in the above embodiment can have higher bending rigidity against a compressive load. As above, in rear protrusion type automobiles, the automobile rear body structure according to the above embodiment makes it possible to provide not only enhanced aesthetic design quality but also enhanced functionality, particularly enlargement of a luggage compartment space.

In the above embodiment, the protruded portion 21 is formed to elongate the bottom of the concave portion 22, so that a height dimension of the additional luggage compartment space 23 enlarged based on the protruded portion 21 can be increased. In addition, a space on the rearward side of the concave portion 22 can be enlarged to allow the concave portion 22 to store a larger-diameter spare tier or the jack T in addition to the spare tier T as in the above embodiment. The additional space on the rearward side of the concave portion 22 also makes it possible to displace the position of the concave portion 22 rearward when an original volume of the concave portion 22 is maintained after the enlargement. In this case, a space on the frontward side of the concave portion 22 (e.g. a space for installing a fuel tank) can be enlarged.

In the above embodiment, the protruded portion 31a is formed in a region of the rear end cross member 30 located between the pair of fixing portions 31b, so that the rear side frames 10 can have the same longitudinal length as heretofore without elongating the longitudinal length thereof. This eliminates the need for displacing a position of (each front end of) the crushable tubes 41 to be attached to the fixing portions 31b, in the rearward direction, so as to satisfy both of a sufficient length of the crushable tubes 41 and a sufficient volume of the additional luggage compartment space without increasing the entire body length.

In the above embodiment, the striker S adapted to engage a lower portion of the lid 5 during the operation for closing the opening 1 is attached onto a laterally central region of the rear end cross member 30, and the rear end cross member 30 is designed to have a greater sectional area in the laterally central region than that in opposite lateral end regions thereof. This makes it possible to provide enhanced rigidity in the laterally central region of the rear end cross member 30 supporting the striker S on which a relatively large load is likely to be imposed.

In the above embodiment, each of the rear edge (32b) of the rear end cross member, the rear bumper reinforcing member 40 and the rear bumper 50 is formed to have a substantially circular arc shape in top plan view, so as to conform respective shapes thereof to each other. This allows the rear edge (32b) of the rear end cross member to be disposed closer to the rear bumper reinforcing member 40. Thus, the rear edge (32b) of the rear end cross member 30 (or the expanded portion 31a) can be formed to more largely project rearward so as to enlarge the sectional area of the rear end cross member 30. This can provide enhanced rigidity in the rear end cross member 30. It is understood that the additional luggage compartment space 23 can also be enlarged as the expanded portion 31a is more largely expanded. Further, the arrangement of the rear end cross member disposed closer to the rear bumper reinforcing member 40 allows the rear bumper 50 to be disposed closer to the rear end cross member 30. This makes it possible to reduce a distance between the rear bumper 50 and the rear end cross member 30 so as to provide enhanced supporting rigidity for the rear bumper 50.

As mentioned above, the automobile rear body structure of the present invention comprises an opening formed in a rear end of an automobile rear body and adapted to be selectively opened and closed by a lid, a rear floor pan supported by a pair of laterally-spaced rear side frames to define a bottom of a luggage compartment space of the automobile rear body, and a rear end cross member fixed to respective rear ends of the pair of rear side frames. The rear end cross member has an expanded portion formed to expand rearward relative to the rear ends of the pairs of rear side frames, and the rear floor pan has a rear edge including a protruded portion which is formed to protrude relative to the rear ends of the pairs of rear side frames toward the expanded portion of the rear end cross member and connected to the rear end cross member, so as to allow the luggage compartment space to be enlarged rearward relative to the rear ends of the pairs of rear side frames.

In this automobile rear body structure, a longitudinal length of the luggage compartment space is increased based on the expanded portion and the protruded portion formed in the above manner. Thus, according to the present invention, the additional luggage compartment space defined by the expanded portion and the protruded portion can be positioned in a space created between a line connecting the rear ends of the pair of rear side frames and a rear bumper reinforcing member attached at a rearward position relative to the rear side frames, so as to allow the space between the rear side frames and the rear bumper reinforcing member to be effectively utilized as a luggage compartment space. In addition, the luggage compartment space can be enlarged based on the expanded portion and the protruded portion formed, respectively, to expand and protrude relative to the rear ends of the rear side frames, as described above. Thus, there is no need for elongating the rear side frames. Further, the expanded portion can be formed in conformity to a shape of a rear end, for example, of a rear protrusion type automobile. This fits a design requirement of the rear protrusion type automobile. While the present invention is suitable, particularly, for the rear protrusion type automobile, it may be any other type of automobile having a space created between a rear bumper reinforcing member and a line connecting respective rear ends of a pair of rear side frames.

Preferably, in the automobile rear body structure of the present invention, the rear end cross member includes a rear end panel constituting the expanded portion, and the protruded portion of the rear floor pan is connected to the expanded portion of the rear end panel. In this case, an additional luggage compartment space can be readily formed based on the expanded portion of the rear end panel and the protruded portion of the rear floor pan.

Preferably, in the automobile rear body structure of the present invention, the rear floor pan has a concave portion adapted to store a spare tire therein, and the protruded portion is formed of a rearward extension of a bottom of the concave portion. In this case, the protruded portion formed of the rearward extension of the bottom of the concave portion makes it possible to increase a height dimension of the additional luggage compartment space enlarged based on the protruded portion. In addition, a space on the rearward side of the concave portion can be enlarged to allow the concave portion to store a larger-diameter spare tier or a jack in addition to a normal-diameter spare tier. The additional space on the rearward side of the concave portion also makes it possible to displace the position of the concave portion rearward when an original volume of the concave portion is maintained after the enlargement. Further, a space on the frontward side of the concave portion (e.g. a space for installing a fuel tank) can be enlarged.

Preferably, the automobile rear body structure of the present invention further includes a rear bumper reinforcing member which is connected to the rear ends of the pairs of rear side frames through the rear end cross member and a pair of mounting members having the rear bumper reinforcing member mounted thereto. The pair of mounting members are attached, respectively, to the rear ends of the pairs of rear side frames through the rear end cross member, and the rear end cross member is formed with a pair of fixing portions each having a corresponding one of the mounting members fixed thereto. The expanded portion is formed in a region of the rear end cross member located between the pair of fixing portions. In this case, the protruded portion is formed in a region of the rear end cross member located between the pair of fixing portions, so that a longitudinal length of the rear side frames is not increased. This eliminates the need for displacing each front end of the mounting members represented by crushable tubes to be attached to the fixing portions, in the rearward direction, so as to satisfy both of a sufficient length of the mounting members and a sufficient volume of the additional luggage compartment space without increasing the entire body length.

Preferably, the automobile rear body structure of the present invention further includes a rear bumper curved rearward in a substantially circular arc shape in top plan view, and a pair of rear pillar portions defining the opening. The rear end cross member has opposite lateral ends connected, respectively, to the pair of rear pillars, a rear edge formed to project rearward relative to the rear ends of the pair of rear side frames and in conformity to the shape of the rear bumper in top plan view so as to have a substantially circular arc shape in top plan view, and a front edge extending substantially linearly to connect between the rear ends of the rear side frames. In this case, the rear end cross member is connected to the rear pillars, so that the body structure around the opening can have enhanced rigidity against deformation. In addition, differently from the rear end of the rear end cross member, the front edge of the rear end cross member is formed to extend substantially linearly to connect between the rear ends of the pair of rear side frames. Thus, the bending rigidity of the rear end cross member can be increased so as to further increase the rigidity against deformation in the body structure around the opening. Furthermore, the rear edge of the rear end cross member is formed in conformity to the shape of the rear bumper in top plan view, so that the lid can be formed in conformity to the shape of the rear bumper. Thus, the automobile rear body structure of the present invention makes it possible to provide not only enhanced aesthetic design quality but also enhanced functionality, particularly enlargement of a luggage compartment space.

Preferably, this automobile rear body structure further includes a striker attached onto a laterally central region of the rear end cross member and adapted to engage a lower portion of the lid during an operation for closing the opening. The front edge and the rear edge are formed to allow the rear end cross member to have a greater sectional area in the laterally central region than that in opposite lateral end regions thereof. This structure makes it possible to provide enhanced rigidity in the laterally central region of the rear end cross member supporting the striker on which a relatively large load is likely to be imposed.

Preferably, the above automobile rear body structure including the rear bumper further includes a rear bumper reinforcing member disposed between the rear end cross member and the rear bumper, and connected to the rear ends of the pair of rear side frames through the rear end cross member. The rear bumper reinforcing member is formed to have a substantially circular arc shape in top plan view, in conformity to the shape of the rear edge of the rear end cross member in top plan view. This structure allows the rear edge of the rear end cross member to be disposed closer to the rear bumper reinforcing member. Thus, the rear edge of the rear end cross member can be formed to more largely project rearward so as to enlarge the sectional area of the rear end cross member. This can provide enhanced rigidity in the rear end cross member. Further, the arrangement of the rear end cross member disposed closer to the rear bumper reinforcing member allows the rear bumper to be disposed closer to the rear end cross member so as to provide enhanced supporting rigidity for the rear bumper.

Preferably, in the above automobile rear body structure where the rear end cross member is connected to the pair of rear pillars, the rear end cross member includes a rear end panel, and a reinforcement panel attached to the rear end panel at a frontward position relative to the rear end panel to define a closed section in cooperation with the rear end panel. The reinforcement panel has opposite lateral ends each connected to a corresponding one of the pair of rear pillar portions defining the opening. The rear end cross member connected to the pair of rear pillars can provide enhanced rigidity against deformation in the body structure around the opening.

Preferably, in this automobile rear body structure where the rear end cross member has the reinforcement member, at least a portion of the reinforcement panel extends frontward to overhang above the rear end panel so as to define an additional luggage compartment space under the overhanging portion 320 of the reinforcement panel. In this case, an additional luggage compartment space can be defined under the reinforcement panel to readily enlarge the luggage compartment space.

Preferably, in the automobile rear body structure of the present invention, the rear end cross member includes a rear end panel forming a rear surface of the rear end cross member, and a reinforcement panel forming a front surface of the rear end cross member and defining a closed section in cooperation with the rear end panel. The rear end panel and the reinforcement panel are partly superimposed on one another at a position below the closed section to form a superimposed panel portion which is joined to the respective rear ends of the pair of rear side frames. In this case, the rear ends of the rear side frames can be joined to the rear end cross member in a position of the superimposed panel portion formed by superimposing the rear end panel and the reinforcement panel of the rear end cross member. Thus, the joined region between the rear end cross member and the rear ends of the rear side frames can be more strengthened to provide enhanced body rigidity.

Preferably, this automobile rear body structure further includes a pair of crushable tubes connected, respectively, to the rear ends of the pair of rear side frames through the superimposed panel portion, and adapted to absorb collision energy, and a rear bumper reinforcing member connected to respective rear ends of the pair of crushable tubes. In this case, a lattice-shaped frame is formed in the rear body by the rear end cross member, the rear bumper reinforcing member and the crushable tubes. This makes it possible to further increase the body rigidity. Further, this structure where the crushable tubes are attached to the superimposed panel portion of the rear end cross member has an advantage of being able to strengthen each attached end of the crushable tubes so as to facilitate exerting an initial shock-absorbing function of the crushable tubes.

Preferably, in the above automobile rear body structure where the rear end cross member has the superimposed panel portion, the rear floor pan has a concave portion located between the pair of rear side frames and adapted to store a spare tier therein, and the superimposed panel portion of the rear end cross member is formed in lateral positions on both sides of the concave portion of the rear floor pan except for a lateral position corresponding to the concave portion. In this case, the superimposed panel portion of the rear end cross member is not formed in the lateral position corresponding to the concave portion. This can facilitate reduction in body weight.

Preferably, in this automobile rear body structure, the expanded portion of the rear end cross member is formed in either one of the rear end panel and the reinforcement panel, in the lateral position corresponding to the concave portion of the rear floor pan. In this case, the expanded portion can be formed in either one of the rear end panel and the reinforcement panel to further facilitate reduction in body weight.

This application claims priority from both Japanese Patent Application Serial Nos. 2004-329836, 2004-329837, and 2005-095566, that were filed with Japan Patent Office on Nov. 12, 2004, Nov. 12, 2004, and Mar. 29, 2005, respectively. Thus, it is deemed that the contents of those Japanese Applications constitute part of the present application as incorporation of reference.

Although the present invention has been described in terms of specific exemplary embodiments, it will be appreciated that various modifications and alterations might be made by those skilled in the art without departing from the spirit and scope of the invention as set forth in the following claims.

What is claimed is:

1. An automobile rear body structure for an automobile with an opening formed in a read end of an automobile rear body, which is selectively opened and closed by a lid, said automobile rear body structure comprising:
   a rear floor pan supported by a pair of laterally-spaced rear side frames to define a bottom of a luggage compartment space of said automobile rear body; and
   a rear end cross member fixed to respective rear ends of said pair of rear side frames,
   wherein:
   said rear end cross member has an expanded portion formed to expand rearward relative to the rear ends of said pairs of rear side frames;
   said rear floor pan has a rear edge including a protruded portion which is formed to protrude relative to the rear ends of said pairs of rear side frames toward said expanded portion of said rear end cross member and connected to said rear end cross member, so as to allow said luggage compartment space to be enlarged rearward relative to the rear ends of said pairs of rear side frames;
   said rear end cross member includes a rear end panel constituting said expanded portion; and
   said protruded portion of said rear floor pan is connected to said expanded portion of said rear end panel.

2. An automobile rear body structure for an automobile with an opening formed in a read end of an automobile rear body, which is selectively opened and closed by a lid, said automobile rear body structure comprising:
   a rear floor pan supported by a pair of laterally-spaced rear side frames to define a bottom of a luggage compartment space of said automobile rear body; and
   a rear end cross member fixed to respective rear ends of said pair of rear side frames,
   wherein:
   said rear end cross member has an expanded portion formed to expand rearward relative to the rear ends of said pairs of rear side frames;

said rear floor pan has a rear edge including a protruded portion which is formed to protrude relative to the rear ends of said pairs of rear side frames toward said expanded portion of said rear end cross member and connected to said rear end cross member, so as to allow said luggage compartment space to be enlarged rearward relative to the rear ends of said pairs of rear side frames;

said rear floor pan has a concave portion adapted to store a spare tire therein; and said protruded portion is formed of a rearward extension of a bottom of said concave portion.

3. An automobile rear body structure for an automobile with an opening formed in a read end of an automobile rear body, which is selectively opened and closed by a lid, said automobile rear body structure comprising:

a rear floor pan supported by a pair of laterally-spaced rear side frames to define a bottom of a luggage compartment space of said automobile rear body;

a rear end cross member fixed to respective rear ends of said pair of rear side frames, a rear bumper reinforcing member which is connected to the rear ends of said pairs of rear side frames through said rear end cross member; and a pair of mounting members having said rear bumper reinforcing member mounted thereto, said pair of mounting members being attached, respectively, to the rear ends of said pairs of rear side frames through said rear end cross member, said rear end cross member being formed with a pair of fixing portions each having a corresponding one of said mounting members fixed thereto, wherein said rear end cross member has an expanded portion formed to expand rearward relative to the rear ends of said pairs of rear side frames;

said expanded portion is formed in a region of said rear end cross member located between said pair of fixing portions; and said rear floor pan has a rear edge including a protruded portion which is formed to protrude relative to the rear ends of said pairs of rear side frames toward said expanded portion of said rear end cross member and connected to said rear end cross member, so as to allow said luggage compartment space to be enlarged rearward relative to the rear ends of said pairs of rear side frames.

4. An automobile rear body structure for an automobile with an opening formed in a read end of an automobile rear body, which is selectively opened and closed by a lid, said automobile rear body structure comprising:

a rear floor pan supported by a pair of laterally-spaced rear side frames to define a bottom of a luggage compartment space of said automobile rear body;

a rear end cross member fixed to respective rear ends of said pair of rear side frames, a rear bumper curved rearward in a substantially circular arc shape in top plan view; and a pair of rear pillar portions defining said opening, wherein:

said rear end cross member has an expanded portion formed to expand rearward relative to the rear ends of said pairs of rear side frames;

opposite lateral ends connected, respectively, to said pair of rear pillars;

a rear edge formed to project rearward relative to the rear ends of said pair of rear side frames and in conformity to the shape of said rear bumper in top plan view so as to have a substantially circular arc shape in top plan view; and a front edge extending substantially linearly to connect between the rear ends of said rear side frames; and wherein said rear floor pan has a rear edge including a protruded portion which is formed to protrude relative to the rear ends of said pairs of rear side frames toward said expanded portion of said rear end cross member and connected to said rear end cross member, so as to allow said luggage compartment space to be enlarged rearward relative to the rear ends of said pairs of rear side frames.

5. The automobile rear body structure as defined in claim 4, further comprising a striker attached onto a laterally central region of said rear end cross member and adapted to engage a lower portion of said lid during an operation for closing said opening, wherein said front edge and said rear edge are formed to allow said rear end cross member to have a greater sectional area in said laterally central region than that in opposite lateral end regions thereof.

6. The automobile rear body structure as defined in claim 4, further comprising a rear bumper reinforcing member disposed between said rear end cross member and said rear bumper, and connected to the rear ends of said pair of rear side frames through said rear end cross member, said rear bumper reinforcing member being formed to have a substantially circular arc shape in top plan view, in conformity to the shape of the rear edge of said rear end cross member in top plan view.

7. The automobile rear body structure as defined in claim 4, wherein said rear end cross member includes a rear end panel, and a reinforcement panel attached to said rear end panel at a frontward position relative to said rear end panel to define a closed section in cooperation with said rear end panel, said reinforcement panel having opposite lateral ends each connected to a corresponding one of said pair of rear pillar portions defining said opening.

8. The automobile rear body structure as defined in claim 7, wherein at least a portion of said reinforcement panel extends frontward to overhang above said rear end panel so as to define an additional luggage compartment space under said overhanging portion of said reinforcement panel.

9. An automobile rear body structure for an automobile with an opening formed in a read end of an automobile rear body, which is selectively opened and closed by a lid, said automobile rear body structure comprising:

a rear floor pan supported by a pair of laterally-spaced rear side frames to define a bottom of a luggage compartment space of said automobile rear body; and a rear end cross member fixed to respective rear ends of said pair of rear side frames, wherein:

said rear end cross member has an expanded portion formed to expand rearward relative to the rear ends of said pairs of rear side frames;

said rear floor pan has a rear edge including a protruded portion which is formed to protrude relative to the rear ends of said pairs of rear side frames toward said expanded portion of said rear end cross member and connected to said rear end cross member, so as to allow said luggage compartment space to be enlarged rearward relative to the rear ends of said pairs of rear side frames; and said rear end cross member includes:

a rear end panel forming a rear surface of said rear end cross member; and a reinforcement panel forming a front surface of said rear end cross member and defining a closed section in cooperation with said rear end panel, wherein:

said rear end panel and said reinforcement panel being partly superimposed on one another at a position below said closed section to form a superimposed panel portion which is joined to the respective rear ends of said pair of rear side frames.

10. The automobile rear body structure as defined in claim 9, further comprising:

a pair of crushable tubes connected, respectively, to the rear ends of said pair of rear side frames through said superimposed panel portion, and adapted to absorb collision energy; and a rear bumper reinforcing member connected to respective rear ends of said pair of crushable tubes.

11. The automobile rear body structure as defined in claim 9, wherein:

said rear floor pan has a concave portion located between said pair of rear side frames and adapted to store a spare tier therein; and said superimposed panel portion of said rear end cross member is formed in lateral positions on both sides of said concave portion of said rear floor pan except for a lateral position corresponding to said concave portion.

12. The automobile rear body structure as defined in claim 11, wherein said expanded portion of said rear end cross member is formed in either one of said rear end panel and said reinforcement panel, in a lateral position corresponding to said concave portion of said rear floor pan.

* * * * *